No. 808,742. PATENTED JAN. 2, 1906.
H. A. GALE.
MACHINE FOR FORMING BOX SHOOKS.
APPLICATION FILED JULY 29, 1905.
5 SHEETS—SHEET 2.
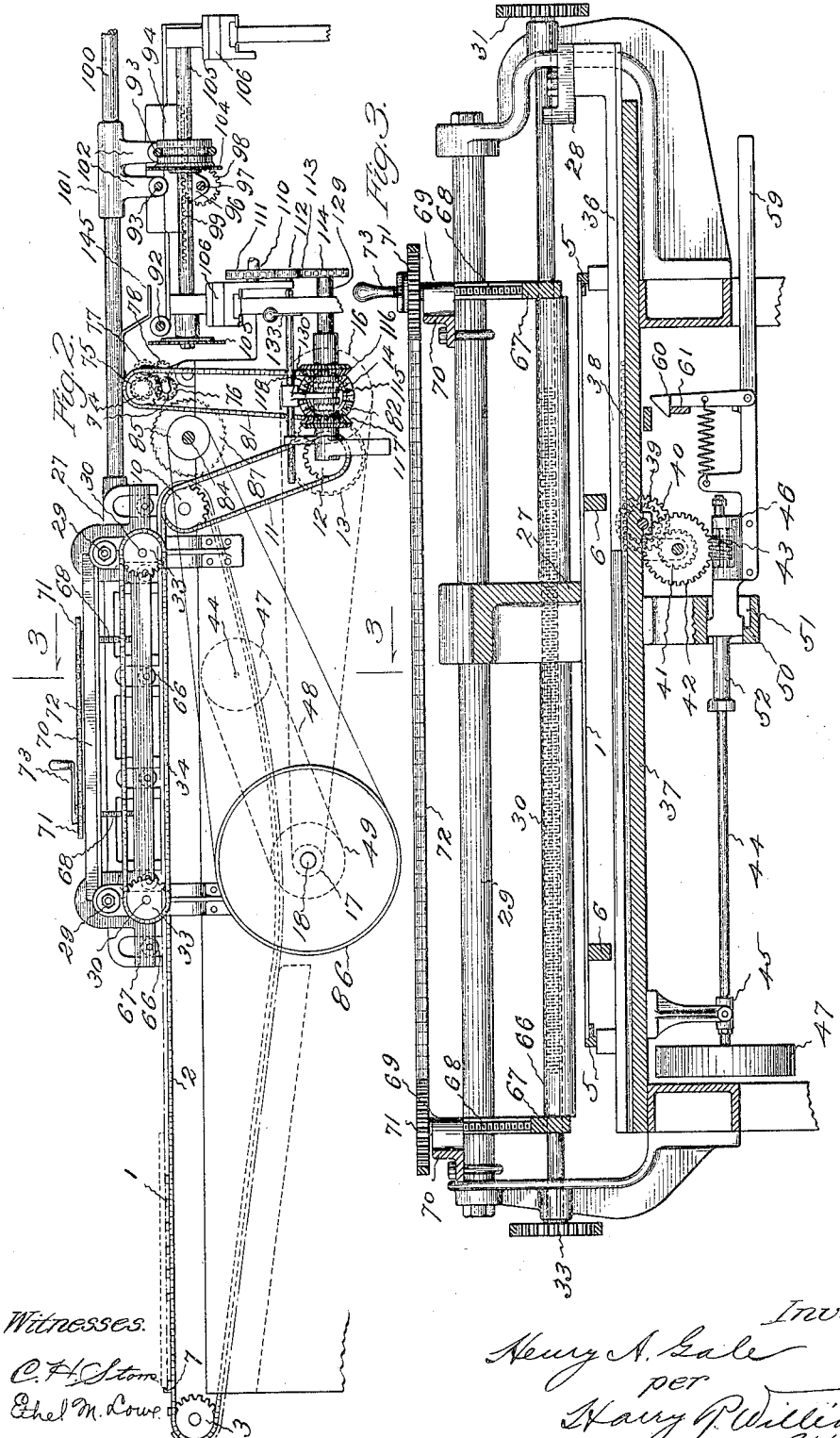
Witnesses.
C. H. Stow
Ethel M. Lowe
Inventor.
Henry A. Gale
per
Harry P. Williams
Attorney.

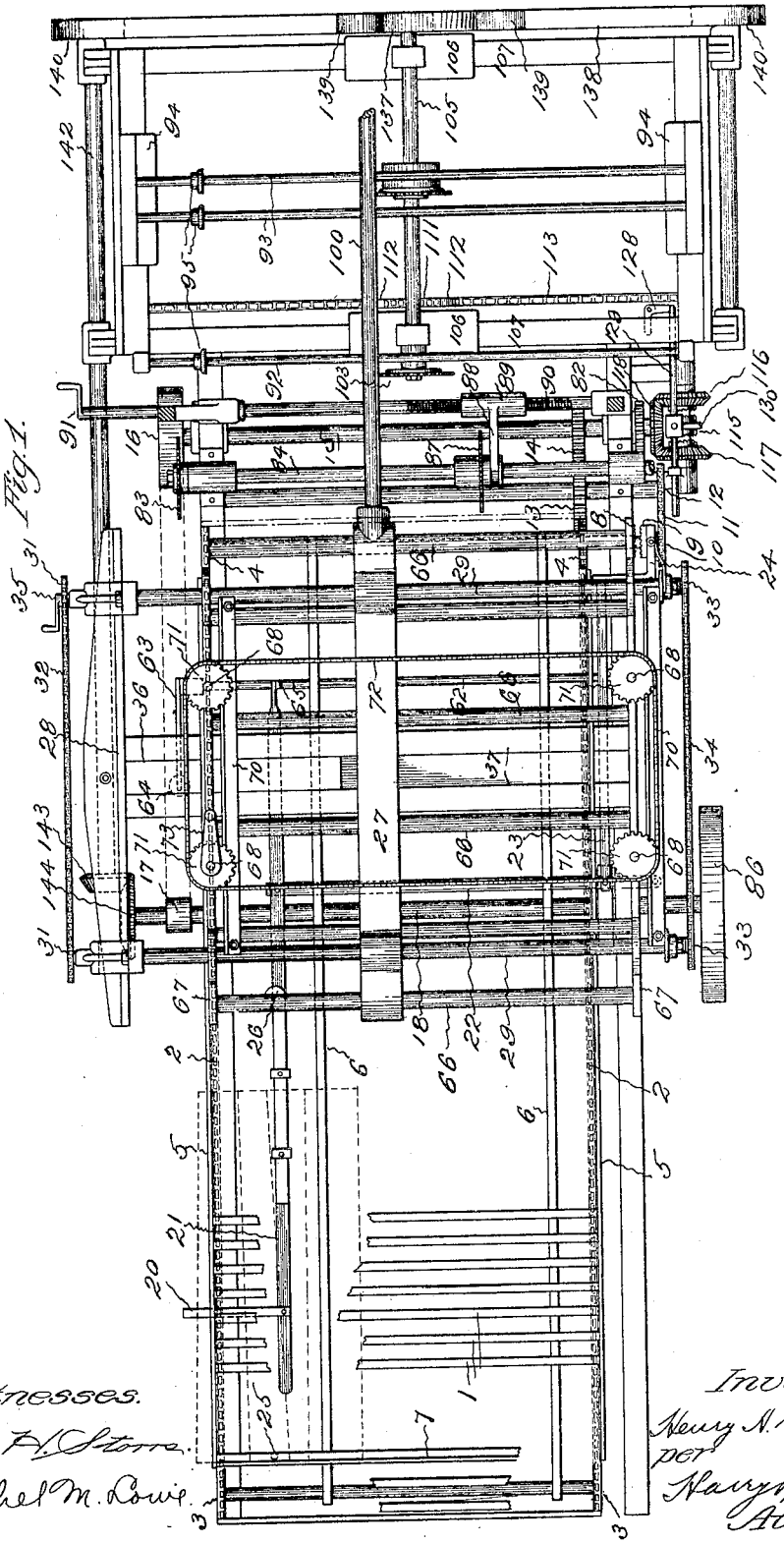

No. 808,742. PATENTED JAN. 2, 1906.
H. A. GALE.
MACHINE FOR FORMING BOX SHOOKS.
APPLICATION FILED JULY 29, 1905.
5 SHEETS—SHEET 3.
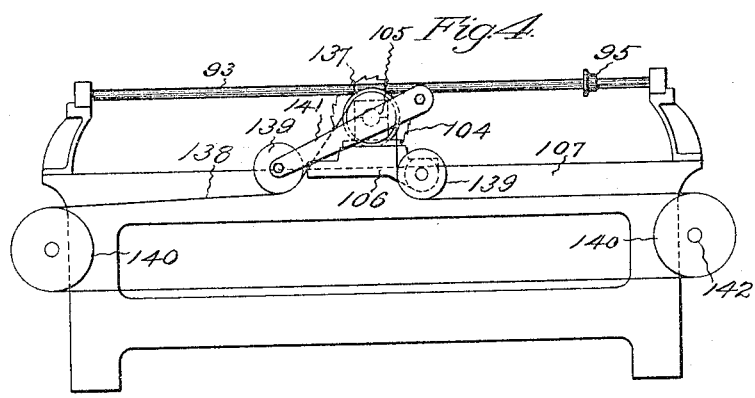
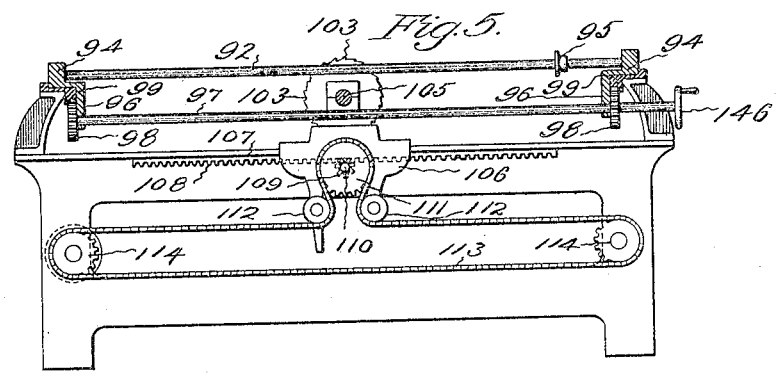
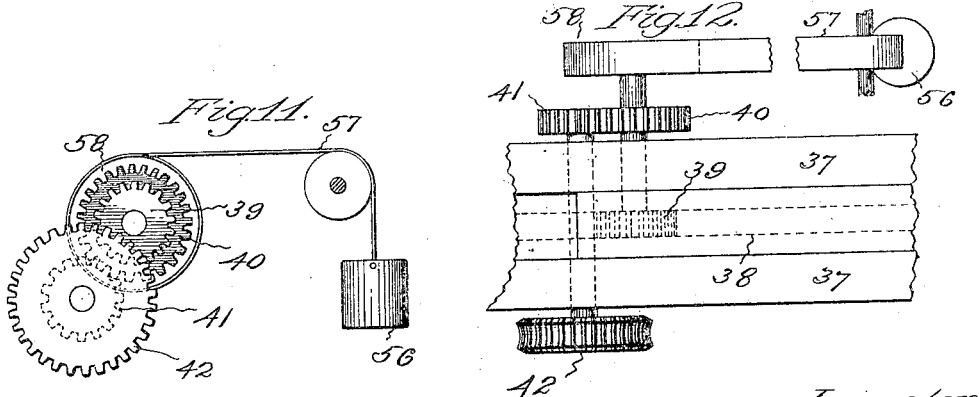
Witnesses.
C. H. Storrs.
Ethel M. Lowe.
Inventor.
Henry A. Gale
per
Harry P. Williams
Attorney.

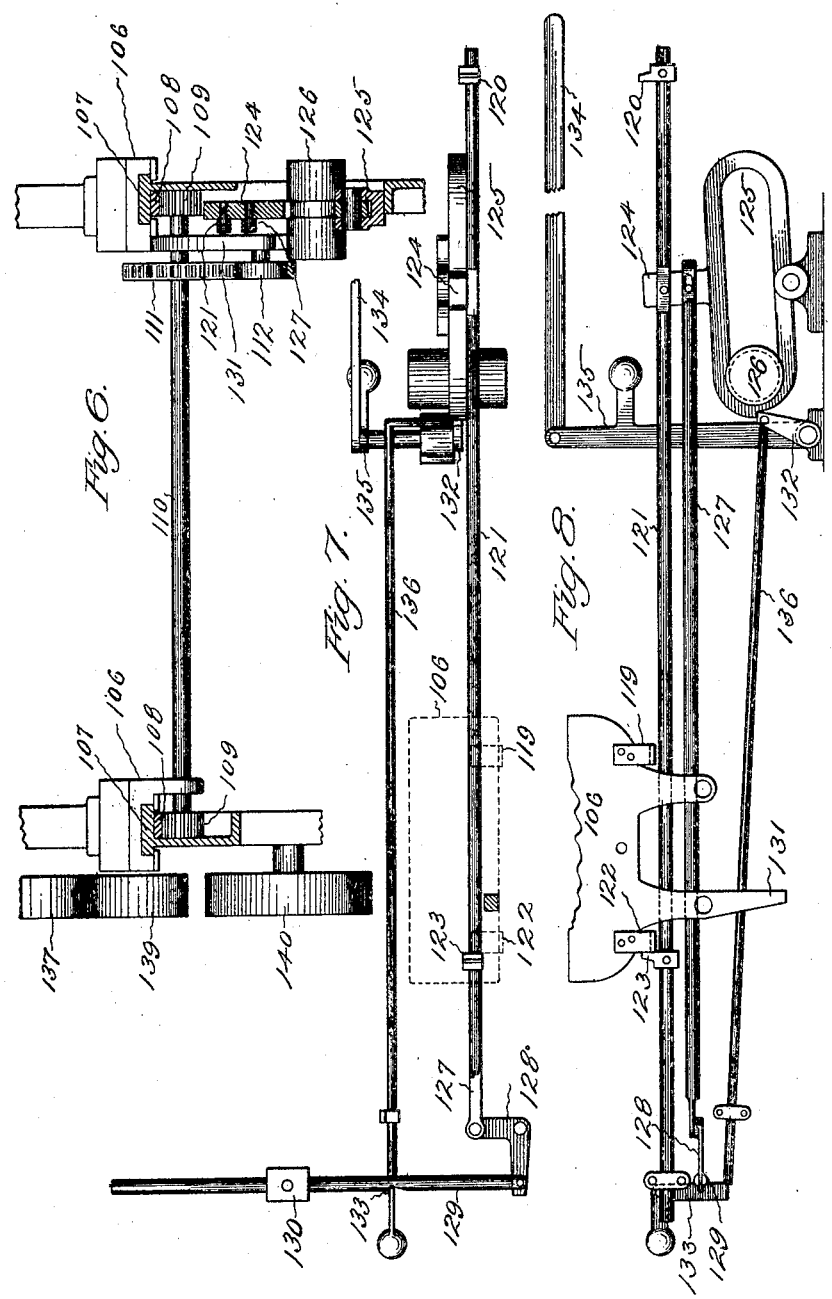

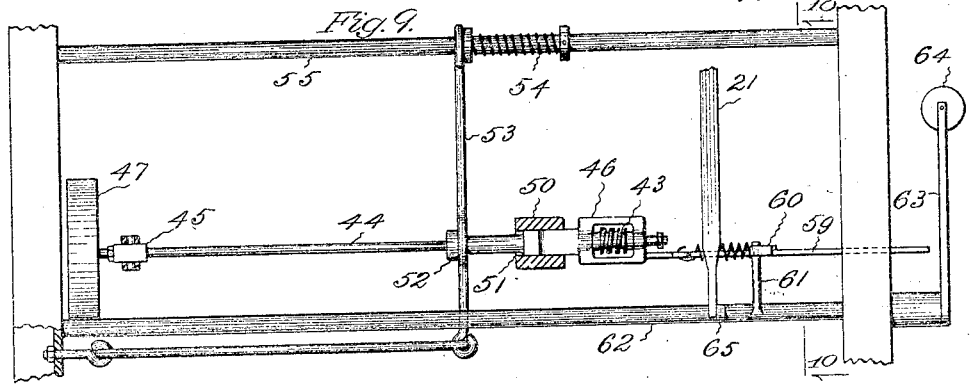
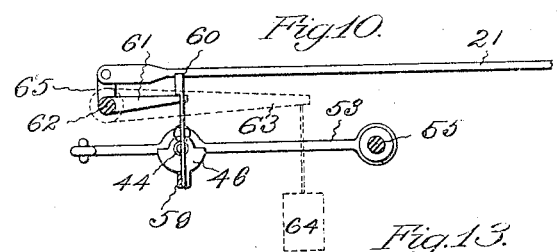
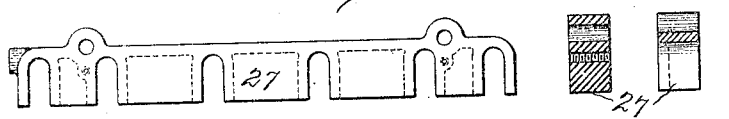
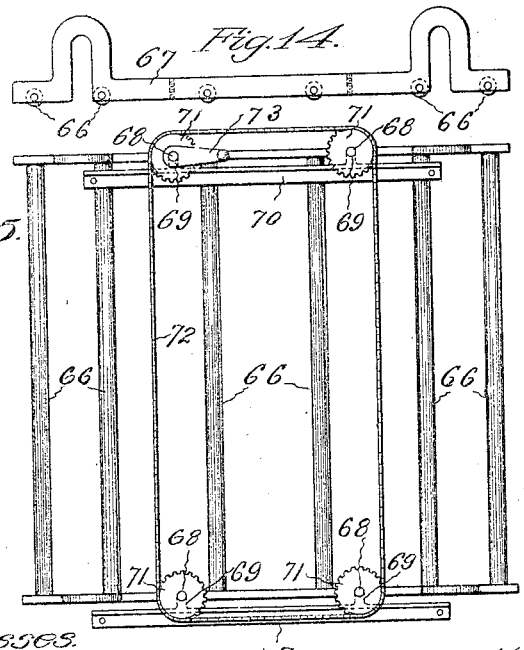
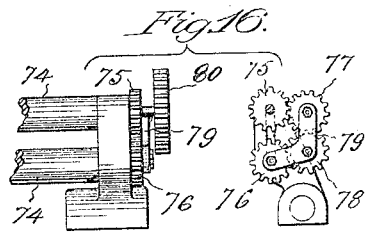
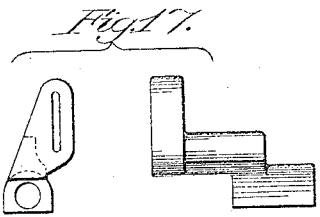

UNITED STATES PATENT OFFICE.

HENRY A. GALE, OF HARTFORD, CONNECTICUT, ASSIGNOR TO GEORGIANA C. GALE, OF HARTFORD, CONNECTICUT.

MACHINE FOR FORMING BOX-SHOOKS.

No. 808,742.  Specification of Letters Patent.  Patented Jan. 2, 1906.

Application filed July 29, 1905. Serial No. 271,791.

*To all whom it may concern:*

Be it known that I, HENRY A. GALE, a citizen of the United States, residing at Hartford, in the county of Hartford and State of Connecticut, have invented a new and useful Machine for Forming Box-Shooks, of which the following is a specification.

This invention relates to a machine which squeezes together edgewise matched boards and saws off the sides and trims the ends of the joined boards for the purpose of forming box-shooks of the required size.

The object of the invention is to provide a simple, easily-operated, and efficient machine which accomplished these results.

The machine which is illustrated in the drawings as embodying the invention has a movable bed which feeds the tongued and grooved boards lengthwise, a press which squeezes the boards together edgewise and releases them when they are properly joined, saws which cut off the edges of one or more boards as they are fed by the bed after having been squeezed, so that the shook will be the desired width, and saws which travel transversely and trim the ends square and make the shook the desired length.

Figure 1 shows a plan of the machine with some parts broken away and some omitted in order to more clearly show the construction. Fig. 2 is a rear elevation of the machine with the frame broken away. Fig. 3 is a transverse section, on larger scale, on the plane indicated by the line 3 3 on Fig. 2. Fig. 4 is a view looking at one end of the machine, showing the mechanism for rotating the trimming-saws. Fig. 5 is a transverse section showing the means for feeding the trimming-saws. Fig. 6 shows details on larger scale of portions of the mechanism for feeding the trimming-saws. Fig. 7 shows a plan of the mechanism for setting in operation and controlling the action of the trimming-saws. Fig. 8 is an elevation of this mechanism. Fig. 9 shows a plan of a part of the mechanism employed for releasing the movable press-jaw after sufficient squeeze has been given to the boards. Fig. 10 is a section taken on the plane indicated by 10 10 on Fig. 9. Fig. 11 shows a side elevation of a portion of the gearing employed for drawing back the press-jaw. Fig. 12 shows a plan of the gearing shown in Fig. 11. Fig. 13 shows views of the stationary press-jaw. Fig. 14 is a side view of one of the frames that carry the holder-rolls. Fig. 15 shows a plan of the holder frame and rolls. Fig. 16 shows side and edge views of the feed-roll gearing. Fig. 17 shows side and edge views of one of the feed-roll brackets.

A number of tongued and grooved boards that preferably have their edges coated with glue, which are a little longer than will be the finished shook and which when pressed together will be a little wider than the finished shook, are placed longitudinally on the bed at one end of the machine. This bed is formed of a number of transversely-extending slats 1, (only a few of which are shown,) attached at each end to a chain 2. These chains pass around sprockets 3 at one side of the machine and sprockets 4 near the middle of the machine. The slats are desirably supported at their ends by fixed guide-bars 5 and some distance in from the ends by adjustable supporting-bars 6. At intervals—for instance, every five feet—a slat is provided with an upwardly-extending rib 7, so arranged as to catch the ends of the boards and when the bed moves push them along, Figs. 1, 2.

The shaft which supports the inner chain-sprockets is provided with one member of a clutch 8. The other member 9 of this clutch is connected with a sprocket 10, around which passes a chain 11 to a sprocket 12 on a shaft that has a gear 13, which meshes with a gear 14 on a shaft 15, which on the front side of the machine has a pulley 16, that is driven by a belt that passes around a pulley 17 on the main driving-shaft 18, Figs. 1, 2. When the clutch members are engaged, the bed is advanced and carries the boards forwardly. The clutch members are engaged when the handle 20 is moved toward the side of the machine. This handle is fastened to a bar 21, that is connected with a lever 22, which near the back of the machine is connected by a link 23 with an angle-lever 24, which engages the movable clutch member. A movement of the handle in the opposite direction disengages the clutch members and causes the table to stop, Fig. 1.

On each of the bed-slats that bears a pushing-rib is a downwardly-extending lug 25, that is adapted to engage a hook 26, which is adjustably attached to the bar 21. The engagement of these lugs with the hook, which is properly adjusted, stops the bed in the predetermined position. Before the handle is moved sidewise for engaging the clutch members and starting the bed it is pushed back slightly, so as to release the hook from the slat-lug, Fig. 1. When the next lug reaches the hook, the bar 21 is moved sidewise, and this causes a disengagement of the clutch members and stops the bed. The hook is so adjusted that the bed carries the boards endwise and stops when they are between the stationary press-jaw 27 and the movable press-jaw 28.

The stationary jaw 27, Fig. 13, is movably supported by two transversely-extending rods 29, that are supported by the frame at the front and back of the machine, Fig. 1. Beneath each of these supporting-rods and extending parallel therewith is a feed-screw 30. These screws extend through threaded perforations in the lower part of the jaw, Fig. 3. At the front each of these feed-screws has a sprocket 31. These sprockets are connected by a chain 32. At the back each of the feed-screws has a sprocket 33, and these are connected by a chain 34. One of the screws is provided with a handle 35, which when turned causes the screws to be rotated and adjusts this jaw to the desired position, Fig. 1.

The movable jaw 28 is pivoted to the top of the front end of a slide 36, which is held by ways 37, that extend from front to back of the machine, Figs. 1, 3. On the under side of this slide is a rack 38, meshing with which is a pinion 39 on a shaft that has a gear 40, which meshes with a pinion 41 on a shaft that has a worm-wheel 42, Fig. 3. This worm-wheel meshes with a worm 43 on a shaft 44, that at the rear of the machine is supported by a hinged bearing 45 and at the front by a bearing 46, that is movable longitudinally on the shaft, Fig. 3. The rear end of this shaft is provided with a pulley 47, that is connected by a belt 48 with a pulley 49 on the main driving-shaft, Fig. 2.

The movable bearing which carries the worm is supported by a bracket 50, secured to the under side of the top of the frame of the machine. The forward part of the opening 51 in this bracket which supports the end of the movable bearing is enlarged, so that when the bearing is moved forwardly it will drop down and allow the worm to become disengaged from the worm-wheel, Fig. 3. Extending rearwardly from the movable bearing is a flanged hub 52, and adapted to engage the flange and draw the bearing rearwardly is a lever 53, which is pressed back by a spring 54 on a bar 55, that extends from front to back of the machine, Figs. 9, 10. This spring through the lever tends to draw the movable bracket to its rear and higher position, and consequently keep the worm in mesh with the worm-wheel. With the worm in mesh with the worm-wheel and the pulley rotating, the worm through the gears and rack draws the slide with the movable press-jaw from the front toward the back of the machine and causes the jaw to squeeze the boards on the bed against the stationary jaw until the tongues and grooves properly match. When the boards are squeezed as tightly as they can be, the movable jaw comes to a stand and then the continued rotation of the worm causes the movable bearing which supports it to be drawn forwardly against the pressure of the spring and to drop to its lower position in the bracket, and thus cause a disengagement of the worm and worm-wheel. When the worm is thus automatically disengaged from the worm-wheel after the boards have received the desired pressure, the movable jaw is drawn toward the front of the machine away from the boards by a weight 56, that is attached to a belt 57, which runs over a drum 58 on the shaft which carries the pinion that meshes with the rack, Figs. 11, 12.

If the worm is disengaged from the worm-wheel, it may be engaged by lifting and pushing rearwardly the handle 59, which projects toward the front of the machine from the movable bearing. When the handle is lifted, the spring tends to force the bearing backwardly, so that its rear end occupies and is held up by the higher part of the opening in the supporting-bracket, Figs. 3, 9.

The handle 59 may be lifted for engaging the worm with the worm-wheel by hand or by means of the hinged hook 60, that extends over and engages the end of a rocker-arm 61. When the pressure on the boards being squeezed is sufficiently great to overcome the force of the spring and the worm pushes the movable bearing forwardly, the hook becomes disengaged from the rocker-arm and allows the handle to drop, Fig. 3.

The rocker-arm 61 is on a shaft 62, that has a lever 63, provided with a weight 64, which tends to tip the rocker-arm down under the hook. This rocker-arm shaft is also provided with an arm 65, that is connected with the end of the bar 21, Figs. 9, 10. When a lug 25 on a bed-slat engages the hook 26 and moves the bar 21 sidewise, so as to disengage the bed-feed-clutch parts and cause the table to stop moving, the bar 21 through these arms lifts the hook and raises the handle, so that the spring will draw the movable bearing back into the upper part of the opening through the bracket and cause the worm to engage the worm-wheel. Thus when the bed is stopped with the boards between the press-jaws the movable jaw is moved rearwardly, so as to squeeze the boards between the movable and stationary jaws.

The boards as they pass between the press-jaws are held down to the table by rolls 66, that extend from front to back of the machine. These rolls are carried by frames 67, Figs. 14, 15, that extend longitudinally of the machine and are supported by four vertically-arranged screws 68. These screws pass through perforations in lugs 69, that extend outwardly from angle-plates 70, which extend longitudinally of the machine and are fastened to and supported by the rods 29, which support the stationary press-jaw, Figs. 1, 3, 15. Each of these screws is provided with a sprocket-wheel 71, and these are connected by a chain 72. One of the screws is provided with a crank-handle 73, which when rotated by means of the chain and sprockets turns all of the screws which support the plates that carry the rolls, so that by turning the crank the distance of the rolls from the top of the bed may be adjusted for boards of varying thickness, Figs. 1, 3, 15.

After several boards have been squeezed to form a shook and another lot of boards are placed on the bed and the handle is moved, so as to connect the clutches and cause the bed to carry the following lot of boards between the press-jaws, the boards which have been squeezed are carried by the bed to a pair of feed-rolls 74, Figs. 2, 16. On the ends of these feed-rolls are pinions 75 and 76, meshing with which are two pinions 77 and 78, that are carried by a yoke 79, Fig. 16. These pinions are geared in this manner in order to allow the feed-rolls to be adjusted to various distances from each other and rotate in the correct direction for advancing the shooks. On the end of one of the feed-roll shafts is a sprocket 80, around which passes a chain 81 to a sprocket-wheel 82 on the shaft 15, which bears the pulley 16, that is driven by a belt from the main driving-shaft, Fig. 2. As the shook is advanced by the bed and pulled by the feed-rolls the front portion of the outside board is trimmed off parallel with the back edge of the shook to make the shook the proper width by a saw 83 on the front end of a shaft 84, Fig. 1, which is provided with a pulley 85, that is belted to the pulley 86 on the main driving-shaft, Fig. 2.

On the shaft 84 and movable toward the front and back of the machine is a saw 87, which may be used for trimming off the back edge of the shook or the front edge of a second shook. The hub of this rear saw is grooved, and extending into the groove is an arm 88, projecting from a nut 89, which is movable on a screw 90, that extends from front to back and is provided with a crank 91 at the front, which may be turned for moving the nut and the saw toward the front or the back of the machine. It is preferred that these parts be so designed that the saw can be adjusted back beyond the line of the back edge of the movable bed, Fig. 1.

After passing the feed-rolls the shook is advanced onto a framework, which supports the shook while its ends are being cut off. In the form of machine shown this framework consists of a fixed bar 92 and a pair of bars 93, which extend from front to back of the machine and have their ends supported by slides 94, which are adapted to be moved sidewise on the frame. These bars have adjustable collars 95, against which the front edge of the shooks rest while their ends are being trimmed, Figs. 1 and 5. An arm 96 extends downwardly from the inside of each of these slides and supports a shaft 97, on which are two pinions 98. These pinions mesh with racks 99, that are secured to the ways on which the slides move, Fig. 5. The shaft at the front of the machine is provided with a crank 146, which when rotated adjusts the slides and the supporting-bars to the desired position for supporting the ends of the shooks.

A bar 100 extends to one side of the machine from the stationary press-jaw, and on this bar is a slide 101, that has two downwardly-projecting lugs 102, that assist in supporting the adjustable bars 93, Fig. 2. The slide moves freely along the jaw-bar when the supporting-bars are adjusted sidewise and the lugs move freely along the bars toward the front or back when the stationary jaw is adjusted.

When the shook is deposited on the supporting-rods, its ends are trimmed square, so that it will be the proper length, by saws 103 and 104, mounted on a shaft 105, that extends longitudinally of the frame. The saw 103 is fixed to the end of the shaft, and the saw 104 is movable along the shaft, its hub being grooved and one of the bars 93 extending through the grooves, so that the saw will be adjusted along the shaft when the bars are adjusted, Fig. 1.

The shaft 105 is supported by two carriages 106, which are movable on ways 107, that extend from front to back of the machine, Fig. 1. On the lower side of each of these ways is a rack 108, and meshing with these racks are two pinions 109 on a shaft 110, that extends from one carriage to the other, Fig. 6. On this shaft is a sprocket-wheel 111, and passing over this sprocket-wheel and two small idle rolls 112, carried by one carriage, is a chain 113, that passes around a pair of sprockets 114, supported at the front and back of the machine, Fig. 5. The sprocket at the rear of the machine is on a shaft which has a clutch member 115. Loose on the same shaft is a bevel-gear 116 and a bevel-gear 117, each of which has a clutch member, Figs. 1 and 2. These bevel-gears mesh with a bevel-gear 118, that is on the shaft 15, Fig. 1. When the clutch connects one of the bevel-gears through the sprockets and chain, the saw-carriages are moved toward the front, and when the clutch connects the other bevel-gear the saw-carriages are moved toward the rear.

Fastened to one of these saw-carriages is a lug 119, that when the carriage nears the forward limit of its movement engages the adjustable dog 120 on a rod 121. This carriage also has a lug 122, that when the carriage is near the rear limit of its movement engages a dog 123 on the rod 121, Fig. 8. The rod 121 is connected with an ear 124, which extends upwardly from an oscillating yoke 125, that supports a weighted roll 126. This ear is connected by a rod 127 with an angle-lever 128, which is connected with a shipper-rod 129, Figs. 7, 8. Carried by this shipper-rod is a yoke 130, which engages the movable clutch member 115 between the bevel-gears 116 and 117, Fig. 2. When the carriage nears the forward limit of its movement, the lug 119 engages the dog 120 and draws the rod 121 forwardly and causes it to tip the yoke, so that the roll will roll down and cause the yoke to tip still farther. A finger 131 is attached to the carriage to assist in moving the roll, Fig. 8. When the yoke tilts in this manner, the clutch member 115 disconnects one of the bevel-gears and connects the other bevel-gear, so that the saw-carriages will move toward the back of the machine. As the saw-carriages near the back of the machine the lug 122 engages the dog 123 and moves the rod 121 rearwardly. This tilts the yoke and causes it to draw the clutch member out, so as to release the bevel-gear which is causing the saw-carriages to move rearwardly.

The yoke is prevented from being tilted way down by the backward movement of the carriages by a catch 132, and the clutch member is prevented from moving too far by a latch 133, Figs. 7, 8. When the saw-carriages reach the backward limit of their movement, it is designed that they shall come to rest, and consequently the clutch member must be stopped with both of the bevel-gears disengaged, but with the mechanism so set that at the proper time the clutch member can be thrown into engagement with the gear that will drive the carriages forward. To start this mechanism into operation, the handle 134 is pushed backwardly. This handle is connected with a rocker-arm 135, that is fastened to the arbor of the yoke-catch 132. When the catch is moved from the yoke, the weighted roll tilts the yoke and causes the clutch to engage the gear which drives the saw-carriages forward. The catch is fastened to a rod 136, that extends rearwardly and is adapted to engage the lower part of the latch 133, so that when the catch is released from the yoke the latch is opened from the shifting bar, allowing the bar to be thrown for causing the proper engagement of the clutch, Figs. 7, 8.

On the outer end of the saw-shaft 105 is a pulley 137. A belt 138 passes over this pulley and under two idler-pulleys 139, supported by the saw-carriage, and then around two pulleys 140. One of the idler-pulleys is mounted on the end of a yoke 141, that is adjustable, so that the tension of the belt may be regulated, Fig. 4. The pulley 140 on the front of the machine is on a shaft 142, that extends longitudinally along the front, and near the middle of the machine is provided with a bevel-gear 143, which meshes with a bevel-gear 144 on the main driving-shaft, Fig. 1.

Attached to the under side of the bar 100, that extends from the stationary press-jaw, is a spring 145, which is adapted to hold the shook down while the saws are trimming off the ends, Fig. 2. If desired, the boards for two shooks may be laid on the table and advanced to the squeezer and then to the saws. In this instance the front saw will trim the one edge of one shook and the rear saw will trim the one edge of the other shook. The moving saws will cut off the ends of both shooks the same length. If desired, the handle which sets in motion the moving bed and sets in motion the end-cutting saws may be connected so that the movement of one will move the other.

The invention claimed is—

1. A machine for forming box-shooks having a stationary jaw, a movable jaw, a movable bed for supporting and advancing the shooks lengthwise between the jaws, means for moving the movable jaw toward the stationary jaw and squeezing the shooks between the jaws, means which automatically arrest this movement of the movable jaw and release the squeeze when the required pressure is obtained, and coöperating mechanism for actuating these means, substantially as specified.

2. A machine for forming box-shooks having a stationary jaw, a movable jaw, a movable bed for supporting and advancing the shooks lengthwise between the jaws, means for moving the movable jaw toward the stationary jaw and squeezing the shooks between the jaws, means which automatically arrest this movement of the movable jaw and release the squeeze when the required pressure is obtained, means for moving the movable jaw away from the stationary jaw, and coöperating mechanism for actuating these means, substantially as specified.

3. A machine for forming box-shooks having a stationary jaw, a movable jaw, a movable bed for supporting and advancing the shooks lengthwise between the jaws, means for moving the movable jaw toward the stationary jaw and squeezing the shooks between the jaws, means which automatically arrest this movement of the movable jaw and release the squeeze when the required pressure is obtained, means for moving the movable jaw away from the stationary jaw, means for trimming the edges of the shooks, and coöperating mechanism for actuating these means, substantially as specified.

4. A machine for forming box-shooks having a stationary jaw, a movable jaw, a movable bed for supporting and advancing the shooks lengthwise between the jaws, means for moving the movable jaw toward the stationary jaw and squeezing the shooks between the jaws, means which automatically arrest this movement of the movable jaw and release the squeeze when the required pressure is obtained, means for moving the movable jaw away from the stationary jaw, means for trimming the edges of the shooks, means for trimming the ends of the shooks, and coöperating mechanism for actuating these means, substantially as specified.

5. A machine for forming box-shooks having a stationary jaw, a movable jaw, a movable bed for supporting and advancing the shooks lengthwise between the jaws, means for moving the movable jaw toward the stationary jaw and squeezing the shooks between the jaws, means which automatically arrest this movement of the movable jaw and release the squeeze when the required pressure is obtained, means for moving the movable jaw away from the stationary jaw, means for trimming the ends of the shooks, and coöperating mechanism for actuating these means, substantially as specified.

6. A machine for forming box-shooks having a jaw adjustably fixed near the back of the bed, a jaw near the front of the bed and movable toward and from the stationary jaw, a movable bed for supporting and advancing the shooks lengthwise between the jaws, means for moving the movable jaw toward the stationary jaw and squeezing the shooks between the jaws, means which automatically arrest this movement of the movable jaw and release the squeeze when the required pressure is obtained, means for moving the movable jaw away from the stationary jaw, means for trimming the edges of the shooks, means for trimming the ends of the shooks, and coöperating mechanism for actuating these means, substantially as specified.

7. A machine for forming box-shooks having a stationary jaw, a movable jaw, means for moving the movable jaw toward the stationary jaw and squeezing the shooks between the jaws, means which automatically arrest this movement of the movable jaw and release the squeeze when the required pressure is obtained, and means for moving the movable jaw away from the stationary jaw, substantially as specified.

8. A machine for forming box-shooks having a stationary jaw, a movable jaw, a movable bed for supporting and advancing the shooks lengthwise between the jaws, means for moving the movable jaw toward the stationary jaw and squeezing the shooks between the jaws, means which automatically arrest this movement of the movable jaw and release the squeeze when the required pressure is obtained, means for moving the movable jaw away from the stationary jaw, two saws adjustable toward the front and back of the machine for trimming the edges of the shooks, two saws adjustable toward and from the ends of the machine for trimming the ends of the shooks, and coöperating mechanism for actuating these means, substantially as specified.

9. A machine for forming box-shooks having chains movable longitudinally of the machine, slats attached to and movable with the chains and forming a bed for supporting and advancing the shooks, rolls for holding the shooks down on the bed, a stationary jaw, a movable jaw, means for moving the movable jaw toward the stationary jaw and squeezing the shooks between the jaws, means which automatically arrest this movement of the movable jaw and release the squeeze when the required pressure is obtained, means for moving the movable jaw away from the stationary jaw, saws for trimming the edges of the shooks, saws for trimming the ends of the shooks, and mechanism for actuating the chains, the jaws and the saws, substantially as specified.

10. A machine for forming box-shooks having a stationary jaw, a movable jaw, a movable bed for supporting and advancing the shooks lengthwise between the jaws, means for moving the movable jaw toward the stationary jaw and squeezing the shooks between the jaws, means which automatically arrest this movement of the movable jaw and release the squeeze when the required pressure is obtained, means for moving the movable jaw away from the stationary jaw, saws rotatable in longitudinal planes and supported by fixed bearings, and saws rotatable in transverse planes and supported by movable bearings, substantially as specified.

11. A machine for forming box-shooks having a movable bed, rolls for holding the shooks down upon the bed, vertically-adjustable frames supporting said rolls, means for adjusting the frames vertically, a stationary jaw, a movable jaw, means for moving the movable jaw toward the stationary jaw and squeezing the shooks between them, means which automatically arrest this movement of the movable jaw and release the squeeze when the required pressure is obtained, and means for moving the movable jaw away from the stationary jaw, substantially as specified.

12. A machine for forming box-shooks having chains, mechanism for moving the chains, slats attached to the chains, feeding-ribs attached to the slats at intervals, mechanism for stopping the feeding of the bed, a stationary jaw, a movable jaw, means for moving the movable jaw toward the stationary jaw and squeezing the shooks between the jaws, means which automatically arrest this movement of the movable jaw and release the squeeze when the required pressure is obtained, means for moving the movable jaw away from the stationary jaw, rolls for holding the shooks down upon the bed, saws for trimming the edges of the shooks, feed-rolls for advancing the shooks, and saws for trimming the ends of the shooks, substantially as specified.

13. In a machine for forming box-shooks the combination of supporting-rods, a stationary jaw carried by the rods, feed-screws engaging and holding the stationary jaw, means for rotating the feed-screws and adjusting the stationary jaw longitudinally of the supporting-rods, a slide supported by the frame, means for moving the slide toward and from the stationary jaw, and a movable jaw pivoted on the slide, substantially as specified.

14. In a machine for forming box-shooks the combination of supporting-rods, a stationary jaw carried by the rods, means for adjusting the jaw on the rods, a slide movable on the frame, a movable jaw pivoted on the slide, gearing for moving the slide toward the stationary jaw, mechanism for disconnecting the gearing when the pressure between the jaws reaches the predetermined degree, and mechanism for moving the slide away from the stationary jaw, substantially as specified.

15. In a machine for forming box-shooks the combination of an adjustable stationary jaw, a movable jaw, gearing for moving the movable jaw toward the stationary jaw, and a spring mechanism for holding the gearing in engagement and adapted to yield and permit the disengagement of the gearing when the pressure between the jaws overcomes the tension of the spring, substantially as specified.

16. A machine for forming box-shooks having a stationary jaw, a movable jaw, a movable bed for supporting and advancing the shooks lengthwise between the jaws, means for moving the movable jaw toward the stationary jaw and squeezing the shooks between the jaws, means which automatically arrest this movement of the movable jaw and release the squeeze when the required pressure is obtained, means for moving the movable jaw away from the stationary jaw, a carriage movable toward and from the back of the machine, means for moving the carriage toward and from the back of the machine, and means for rotating the saws while they are being carried toward and from the back of the machine, substantially as specified.

17. In a machine for forming box-shooks the combination of a carriage movable toward and from the back of the machine, means for moving the carriage toward and from the back of the machine, a shaft borne by the carriage, a saw fixed to the shaft, a saw adjustable on the shaft, means for rotating the shaft while it is being carried toward and from the back, a carriage movable toward and from the side of the machine, and means connecting the sidewise-moving carriage and the adjustable saw borne by the backward-moving carriage whereby when one is adjusted the other is also adjusted, substantially as specified.

HENRY A. GALE.

Witnesses:
 HARRY R. WILLIAMS,
 ETHEL M. LOWE.